2,783,286

CATALYTIC PROCESS FOR THE CONVERSION OF HYDROGEN CHLORIDE TO CHLORINE

Malcolm Bryan Reynolds, Snyder, N. Y., assignor to Olin Mathieson Chemical Corporation, a corporation of Virginia No Drawing. Application July 22, 1952,
Serial No. 300,351

8 Claims. (Cl. 260—659)

My invention relates to the catalytic conversion of hydrogen chloride to chlorine and more particularly to the utilization of hydrogen chloride as chlorine as by application to the chlorination of hydrocarbon gases by means of hydrogen chloride and an oxygen-bearing gas in the presence of a catalyst.

Chlorination of hydrocarbon gases with hydrogen chloride and air has been previously proposed. Two general types of systems in general have been proposed, one employing a Deacon type catalyst such as copper chloride, and the other involving reaction between the hydrocarbon and a chlorine carrier material such as copper oxychloride which is separately regenerated by contact with hydrogen chloride and air. The advantage of the former catalyst system is that the reaction may be conducted in a single reaction stage by admixing the reacting gases and effecting contact with the catalyst at elevated temperature. The disadvantage of the system however is that the most effective of the known catalysts, the copper chlorides, are volatile at the required reaction temperatures. The catalyst must be continuously replaced or recovered and returned to the reaction zone. The problem of catalyst losses is aggravated by employing the catalyst in finely divided state according to the fluidized handling technique. Because of the large surface resulting from the subdivision of the catalyst particles, losses of copper chloride from the supporting surface are extremely high and the life of the catalyst is extremely short. Since it is necessary to handle the catalyst in the form of a fixed bed of granular or pelleted particles, the important heat transfer benefits of the fluidized system are unavailable so that temperature control during the reaction becomes a difficult problem. It is necessary to resort to complexities of reactor design to provide adequate cooling and prevent the occurrence of hot spots. The reaction temperature tends to run high and oxidation losses of hydrocarbon charge accordingly are excessive.

The advantage of the chlorine carrier type reaction system is said to be improved selectivity and control of reaction so that higher yields and better conversions are obtained. The chlorine carrier systems however suffer from the inherent disadvantage that the carrier, e. g. cuprous chloride or copper oxychloride, must be handled in two reaction stages. The carrier material is combined with chlorine material in one stage and is reacted in a separate stage with the hydrocarbon under conditions releasing the chlorine. This operation requires a high rate of recycle of the carrier since only the stoichiometric proportion of chlorine can be combined with the carrier. For example, using a carrier containing about 30% by weight of cupric chloride the theoretical recycle ratio is about 30 pounds of carrier per pound of hydrogen chloride reactant. In actual operation, the ratio may reach 100:1, due in part to incomplete reaction in each of the two stages.

I have discovered that a catalyst essentially consisting of copper silicate incorporated in a porous adsorptive siliceous base material, e. g., silica gel, is effective in promoting the oxidation of hydrogen chloride by means of oxygen or air and in promoting the application of this reaction simultaneously to the chlorination of hydrocarbon gases. The catalyst activity is such that good yields and conversions may be obtained in these reactions at a temperature level avoiding excessive combustion losses. A particular value of the catalyst is that it has an extended life resulting in high yields of chlorine or chlorinated hydrocarbon products per unit of catalyst cost. The catalyst is susceptible of regeneration by simple oxidation means. The stability and physical nature of the catalyst are such that it may be advantageously employed in finely divided state according to the fluidized handling technique so that the advantages of fluidized processing are made available for the oxidation of hydrogen chloride and for the chlorination of hydrocarbon gases by means of hydrogen chloride and air.

In the application of my invention, a copper silicate-siliceous base catalyst is prepared by precipitating copper silicate by reaction of a water-soluble copper salt and a soluble silicate on the surface of a porous adsorptive siliceous material such as silica gel. The relative concentration of materials employed is controlled for a concentration of about 2 to about 10 weight per cent of copper silicate in the finished catalyst. The hydrogen chloride conversion is effected by contacting a mixture of hydrogen chloride and oxygen or an oxygen-bearing gas preferably air with the catalyst in a reaction zone at elevated temperature; e. g. about 300° to 450° C. The chlorination process is conducted by reacting a hydrocarbon feed gas, e. g. an alkane such as ethane or an olefin such as propylene, with hydrogen chloride and an oxygen-bearing gas in a reaction zone in the presence of the copper silicate-siliceous base catalyst at elevated temperature; e. g. about 300° to 400° C. The process is conducted with special advantage by maintaining the body of catalyst in the reaction zone in a fluidized state. For example, with fluidized processing in the chlorination of ethane, the reaction may be advantageously conducted at somewhat lower temperatures.

In preparing the catalyst a sufficient amount of a soluble copper salt, preferably copper sulfate, is employed to provide about 2 to 10% of copper silicate on the siliceous base. Other soluble copper salts may be used, including for example cupric chloride and cupric nitrate. About 4 to 6% copper silicate by weight is preferred in the finished composition. A lower proportion of copper silicate on the silica gel than about 4% means handling greater masses of catalyst in order to effect satisfactory conversion. More than about 10% appears to be ineffective in that no greater surface of catalyst is presented to the reacting gases. As support for the copper silicate catalyst a silica gel of 60-mesh or finer is preferred. Coarser silica gel may be used but is somewhat more difficult to fluidize. Also with the coarser particles, the surface of the catalyst presented to the reacting gases is relatively small so that increased quantities by weight of catalyst must be used to effect satisfactory conversion. Other porous adsorptive siliceous base materials of value as the catalyst support include pumice, a silicate clay, and "Celite," a diatomaceous earth. "Fluorex," an infusorial earth may be used although the resulting catalysts appear to be somewhat less active, giving for example conversions of about 84% in the case of ethane chlorination as compared to 92–95% conversion with silica gel, pumice or "Celite" based catalysts.

The copper silicate is incorporated in the siliceous base, advantageously by precipitation in situ from the soluble copper salt. By way of example, a suitable proportion of copper sulfate is dissolved in a limited amount of water and the solution is admixed with silica gel. When proper proportions are chosen the silica gel forms a slightly damp powder in which all of the copper sulfate and substantially all of the water are absorbed on the surface of the silica gel. The silica gel bearing adsorbed copper salt is added slowly to a solution of sufficient sodium silicate in water to be equivalent to the copper sulfate. The dilution is preferably sufficient to result in a thin paste of silica gel. The reaction occurs quickly at room temperature and the product is filtered, washed and dried thoroughly. The dry material may be screened to remove any coarse particles, is calcined for a brief period at about 800° to 1000° C., suitably for about 15 minutes at about 880° C., and again screened.

The resulting copper silicate-siliceous catalyst has a long life and much lower volatility than previous catalysts used in Deacon type reactions. For example, when the catalyst activity is measured by percent of hydrogen chloride converted into organic chlorine compounds, the conversion at 360° C. of a typical catalyst was initially about 95% and decreased at the rate of only 0.06% per hour over a 90-hour period. In contrast, a catalyst comprising potassium chloride and cupric chloride supported on alumina, tested under comparable conditions showed an initial conversion of about 77% which decreased at a rate of about 25% per hour over a period of 45 minutes. Other Deacon catalysts including cupric chloride on silica gel, infusorial earth and alumina, the same promoted with lead, bismuth or potassium chlorides and a coprecipitated cupric chloride-alumina catalyst similarly have been found to be less satisfactory than the copper silicate-siliceous catalysts. While initial conversions were sometimes in the range of 75-85% with some of these catalysts, catalyst life was very short and regeneration was required at intervals of 15-30 minutes to maintain this level of conversion.

In the application of the new catalysts to hydrogen chloride conversions, the hydrogen chloride with at least sufficient oxygen, which may be in the form of air, for the theoretical conversion to chlorine and water are contacted at elevated temperature in the presence of the catalyst in a reaction zone. In general, the usual conditions and procedures of Deacon processing may be applied. In the case of simultaneous hydrocarbon chlorination, the hydrocarbon feed may be charged in admixture with the hydrogen chloride and air or the gases may be charged separately and brought into intimate contact within the reaction zone.

In the chlorination process, hydrogen chloride, air and ethane, for example, may be charged to the bottom of a reactor containing a body of finely divided copper silicate-siliceous catalyst. The reactant gases then serve to fluidize the catalyst. The reaction vessel, accounting for the desired throughput and reaction variables as described below, is sized to provide linear gas velocities through the catalyst bed of about 0.1 to 5 feet per second, avoiding excessive carry-over of catalyst fines. Normally about 5 volumes of air are required per volume of hydrogen chloride to furnish sufficient oxygen to effect the conversion of all the chlorine contained in the hydrogen chloride to organic combination. The proportion of ethane to hydrogen chloride depends to some extent on the distribution of products desired. Normally for the preparation of ethyl chloride as a principal product, equal volumes of ethane and hydrogen chloride are charged. When higher chlorination products are principally desired the proportion of ethane is advantageously reduced.

In calculating the relative proportions of oxygen, air or oxygen-bearing gas to hydrogen chloride and hydrocarbon to be charged to the reactor, the following equations may be used:

(1) $4HCl + O_2 \rightarrow 2H_2O + 2Cl_2$ (2) $2RH + 2Cl_2 \rightarrow 2RCl + 2HCl$ (3) $2HCl + 2RH + O_2 \rightarrow 2H_2O + 2RCl$ The theoretical requirment of oxygen is thus 0.5 mole per mole of hydrogen chloride. However the equilibrium in the oxidation reaction is shifted in the desired direction by an excess of oxygen and about 150-250% of the theoretical oxygen is appropriately used. Preferably about 200% of theory is advantageous. Thus the preferred ratio of hydrocarbon:hydrogen chloride:oxygen is 1:1:1. Using pure oxygen, substantially the same conversions are obtained and the amount of hydrogen chloride converted per unit of catalyst is about 2.3 times that using air. Usually air is cheaper than oxygen or an oxygen-enriched air and is therefore preferred since conversions are equally high. When air is the oxygen-bearing gas, the preferred ratio of hydrogen chloride:hydrocarbon:air is 1:1:5. Once the reaction mass has been brought up to temperature, the reaction requires temperature control by cooling because of the exothermic oxidation reaction. Conversion then can be controlled by space velocity.

In the operation of the process, temperatures of about 250° to 450° C. may be used but the preferred operation is varied according to the particular reaction involved. For the chlorination of alkane gases, a temperature within the range of about 300° to 450° C. may be employed, but best yields and conversions are obtained in the range of 340° to 390° C. At these temperatures the maximum conversion of hydrogen chloride approaches 100% and is usually well over 90%. For the chlorination of olefin gases, a lower temperature range of about 250° to 400° C. may be employed. The temperature usually is lower for a higher molecular weight gas than for a lower molecular weight gas. The temperature for the hydrogen chloride conversion in the absence of hydrocarbons preferably is the higher portion of the range; i. e. about 350° to 450° C.

At constant temperature, the conversion level may be controlled by space velocity. The weight space velocity is appropriately from about 0.5 to 0.75 hour$^{-1}$ and is preferably about 0.6 to 0.7 hour$^{-1}$.

The process may be operated at substantially atmospheric pressure although the use of elevated pressure is advantageous. The production rate is increased by increasing the maximum obtainable conversion, and product recovery is facilitated since condensation of the chlorinated organic products from the reaction mixture is simpler under pressure. Pressures up to about 75 p. s. i. g. can be obtained relatively cheaply by single stage compressors but higher pressures may be used if desired. Pressures of around 45 p. s. i. g. are particularly advantageous in that they are easily maintained and permit conversions of over 95%.

Since the oxidation reaction is exothermic, provision is appropriately made for cooling by any of several methods. The reactor may be jacketed and cooled by circulation of a suitable liquid coolant in the jacket. Alternatively, the liquid coolant may be conducted into the reaction zone by means of tubes built into the reactor. Direct cooling may be accomplished by introducing a spray of liquid, for example, water into the reaction zone and depending on the absorption of the heat of vaporization to cool the reacting mixture. A suitable fraction of the catalyst may be removed from the reaction zone to a separate chamber and cooled by the introduction of air or other gas. Although the activity of the catalyst decreases at a very low rate it may be removed from the reaction zone, treated to regenerate its activity, cooled and returned to the reaction zone. In cooling the catalyst or removing it for regeneration, it is advantageous to remove adsorbed hydrogen chloride before further treatment. This may be accomplished by removing a side stream of the suspended catalyst and blowing it with fresh air at the reaction temperature. The separated air stream containing hydrogen chloride is recycled to the reaction chamber and the catalyst is removed to a separate chamber for cooling. Corrosion is thus avoided in the cooling section and the air used for this purpose may be discarded.

While the catalyst may be reactivated with or without cooling in a separate zone it is simpler and preferable to reactivate the catalyst in place by stopping temporarily the introduction of hydrocarbon and hydrogen chloride, increasing the rate of air introduction and the temperature of the air introduced. The temperature of the suspended catalyst is thus raised to about 380°–500° C. Reactivation occurs at such temperatures in about 15–60 minutes, following which, cool air is introduced and the flow of hydrocarbon and hydrogen chloride is resumed. The reactor effluent is treated in conventional cooling, compressing, absorption and distillation equipment to recover the chlorinated hydrocarbon products and unreacted materials, eliminating inert or waste gases. Provisions may be made in the usual way, by means of cyclone separation or precipitation equipment to recover catalyst losses.

Unreacted hydrogen chloride is removed by scrubbing with water. Compression of the residual gas with cooling to a suitable degree serves to remove the water without removing any appreciable proportion of the chlorination products. The latter are scrubbed from the gas with a suitable scrubbing agent, for example, a high boiling petroleum oil. Waste gas is discharged and the chlorination products stripped from the rich oil and fractionated to obtain ethyl chloride and other chlorination products.

Under suitable conditions of operation the chlorination products comprise upwards of 50% of ethyl chloride but this may vary under different conditions; e. g., from 30% to 60%, according to the ratio of ethane to hydrogen chloride. Ethylene dichloride usually amounts to 10% to 30% or more with ethylidene dichloride in approximately the same proportions. Beta trichloroethane (1,1,2-trichloroethane) may comprise about 10% to 20% of the mixture. Small proportions of vinyl chloride and other chlorination products may also be present.

The use of a fluidized bed in the practice of the invention is of distinct advantage over the fixed bed reactor. Using the latter, a severe hot spot frequently develops which may reach temperatures above 600° C. With the fluidized bed, uniform temperatures are maintained. The copper silicate-siliceous base catalyst permits lower operating temperatures when handled in a fluidized state. Reactor cooling is easier and loss by burning of the hydrocarbon feed gas is reduced. Thus, at 390° C., oxidation of ethane in ethane chlorination usually is less than 10% and at 360° C., less than 7%.

Specific examples illustrating preparation of catalyst and its application in hydrogen chloride conversions follow:

Example I

A suitable catalyst was prepared by adding 1883 parts of silica gel (through 60– or 80–mesh) to 730 parts of a solution containing 135 parts of copper sulfate. The mixture was blended until the entire mass was superficially dry and of uniform color. The solid was added slowly to an agitated solution of 239 parts of sodium silicate pentahydrate in 4000 parts of water. The solid was filtered, washed with 3000 additional parts of water and refiltered. The catalyst was dried for about 20 hours at 130° C. and calcined at 900° C. for 15 minutes. The black catalyst contained 5.5% of copper silicate.

Example II

Hydrogen chloride was oxidized using the catalyst of Example I in a reactor comprising a stainless steel tube, 4 inches in diameter and 20 feet long. The tube was air jacketed for temperature control. Hydrogen chloride and air were introduced at the rates of 1.19 and 2.84 liters per minute respectively. The space velocity was 0.64 pound of feed per pound of catalyst per hour and the linear velocity at standard temperature and pressure was 0.127 foot per second. Maximum conversion of 70.5% of the hydrogen chloride was obtained at 430° C.

Example III

A reactor comprising a glass tube 2 inches in diameter and 3 feet in height was charged with 526 grams of 60-mesh silica gel bearing about 6% copper silicate. The supported catalyst was fluidized by the introduction at the bottom of the bed of 2.95 liters per minute of air, 0.62 liter per minute of hydrogen chloride and 0.62 liter per minute of ethane, all at a temperature of 260° C. The gas flow was sufficient to fluidize the bed satisfactorily and the temperature was maintained during a run of one hour at 380° C. without the necessity of cooling except by radiation to the atmosphere. The effluent gas was passed through a cyclone separator and upwardly through a scrubbing tower over which water was circulated. The gas was dried by cooling and the water insoluble chlorination products were separated by condensation at —80° C. On fractionation of the dried liquid, 35.3% of ethyl chloride, 21.4% of ethylene dichloride, 16.2% of 1,1,2-trichloroethane, 8.5% of vinyl chloride and 8.6% of ethylidene chloride were identified. Conversion of the hydrogen chloride was 80.7% and of the ethane 67.6%.

Example IV

In a run similar to that of Example III at 360° C., the liquid product contained 39% of ethyl chloride, 25.5% of ethylene dichloride, 14.2% of 1,1,2-trichloroethane, 7.3% of ethylidene chloride and the remainder other chlorination products. The conversion based on hydrogen chloride was 92.4% and on ethane was 61.1%.

Example V

In a similar experiment, the initial conversion of hydrogen chloride was 95.4%. About 51% of the ethane was converted to chloroethanes, 9% burned and 3.5% was converted to ethylene. After 90 hours operation, the hydrogen chloride conversion was 86.8% and the conversion of ethane to chloroethanes was 41.3% with 6.5% burned and 3.5% converted to ethylene. Air then was passed through the catalyst at 430° C. for 15 minutes and at 490° C. for 15 additional minutes. On resuming the flow of ethane, hydrogen chloride and air as before, the hydrogen chloride conversion was 94.5%.

Example VI

An active catalyst was prepared by dissolving 9.6 pounds of anhydrous copper sulfate in 52.9 pounds of distilled water and stirring it with 50 pounds of silica gel. The latter passed a 60-mesh screen but was retained on a 100–mesh screen. The silica gel contained approximately 10% of water. A maximum temperature of 45° C. was developed in the slurry. After eight hours the silica gel and adsorbed copper sulfate was filtered and added in small portions to a stirred solution of 8.2 pounds of sodium silicate dissolved in 182.9 pounds of distilled water. After the addition was complete the product was filtered and dried at 130° C. for 48 hours. It was then sintered for 15 minutes at 900° C. in a gas fired furnace.

Example VII

Ethane was chlorinated under pressure using the catalyst of Example VI in a reactor comprising a stainless steel tube, 4 inches in diameter and 20 feet long. The tube was air jacketed for temperature control. Ethane, hydrogen chloride and air were introduced under a pressure of 45 p. s. i. g. and in a ratio of 1:1:4.76 respectively. Temperature in the reactor was maintained at 360°

C. The space velocity on a weight basis was 0.53 pound of feed per pound of catalyst per hour and the linear velocity at standard temperature and pressure was 0.5 foot per second. Under these conditions hydrogen chloride conversion was 93.4% and ethane conversion was 68.9%. Of this, 60.4% was converted to chlorine containing compounds and 8.5% to oxidation products. No unsaturates were present.

*Example VIII*

Using the reactor of Example VII at 260° C., propylene, hydrogen chloride and air were passed with a space velocity of 0.64 pound of feed per pound of catalyst per hour and a linear velocity of 0.11 foot per second at standard temperature and pressure. The hydrogen chloride conversion was 95.4% and 59.3% of the propylene was converted. Of this, 53.4% represented conversion to a product comprising 80% of propylene dichloride and 5.9% to oxidation products.

*Example IX*

Ethylene was converted to a product containing 80% of ethylene dichloride at temperatures of 290–400° C. with over 90% conversion of hydrogen chloride in the same reactor. Space velocity and linear velocities were the same as in the preceding example. At 310° C. the conversion of hydrogen chloride was 96.1% and of the hydrocarbon 52%. This total comprised 34.7% of the ethylene dichloride product and 17% oxidation products.

I claim:

1. A process for the conversion of hydrogen chloride to chlorine which comprises contacting hydrogen chloride with an oxygen-bearing gas at elevated temperature in a reaction zone in the presence of a copper silicate-siliceous base catalyst composition which consists essentially of about 2 to about 10 weight percent of copper silicate incorporated in a porous adsorptive siliceous base.

2. A process for the conversion of hydrogen chloride to chlorine and simultaneous production of chlorinated hydrocarbon products by chlorination of hydrocarbon gases which comprises contacting a hydrocarbon gas with hydrogen chloride and an oxygen-bearing gas in a reaction zone at elevated temperature in the preesnce of a copper silicate-siliceous base catalyst which consists essentially of about 2 to about 10 weight percent of copper silicate incorporated in a porous adsorptive siliceous base.

3. A process for the conversion of hydrogen chloride to chlorine and simultaneous production of chlorinated hydrocarbon products by chlorination of alkane gases which comprises contacting an alkane gas with hydrogen chloride and an oxygen-bearing gas in a reaction zone at elevated temperature in the presence of a copper silicate-siliceous base catalyst which consists essentially of about 2 to about 10 weight percent of copper silicate incorporated in a porous adsorptive siliceous base.

4. A process for the conversion of hydrogen chloride to chlorine and simultaneous production of chlorinated hydrocarbon products by chlorination of olefin gases which comprises contacting an olefin gas with hydrogen chloride and an oxygen-bearing gas in a reaction zone at elevated temperature in the presence of a copper silicate-siliceous base catalyst which consists essentially of about 2 to about 10 weight percent of copper silicate incorporated in a porous adsorptive siliceous base material.

5. A process for the production of chlorinated hydrocarbon products which comprises contacting a hydrocarbon gas with hydrogen chloride and an oxygen-bearing gas in a reaction zone at elevated temperature in the presence of a copper silicate-siliceous base catalyst which consists essentially of about 2 to about 10 weight percent of copper silicate incorporated in a porous adsorptive siliceous base.

6. The process of claim 5 in which the catalyst base is silica gel.

7. The process of claim 5 in which the catalyst base is pumice.

8. The process of claim 5 in which the catalyst base is a diatomaceous earth.

References Cited in the file of this patent

UNITED STATES PATENTS

| | | |
|---|---|---|
| 85,370 | Deacon | Dec. 29, 1868 |
| 1,696,644 | Patrick | Dec. 25, 1928 |
| 2,005,412 | Connolly et al. | June 18, 1935 |
| 2,161,066 | La Lande | June 6, 1939 |
| 2,308,774 | Oblad et al. | Jan. 19, 1943 |
| 2,451,870 | Richardson et al. | Oct. 19, 1948 |
| 2,510,189 | Nahin et al. | June 6, 1950 |
| 2,640,756 | Wills | June 2, 1953 |
| 2,716,665 | Hadley et al. | Aug. 30, 1955 |

OTHER REFERENCES

Lamy, "Bull. Soc. Chim. de Paris," New Series, vol. 20, pages 2–4 (1873).